United States Patent
Noehren et al.

(10) Patent No.: US 10,177,367 B2
(45) Date of Patent: Jan. 8, 2019

(54) METHOD FOR PRODUCING SURFACE DISCHARGE ELECTRODES AND SEMIFINISHED PRODUCT FOR CARRYING OUT THE METHOD

(71) Applicant: Christian-Albrechts-Universitaet zu Kiel, Kiel (DE)

(72) Inventors: Sandra Noehren, Osterroenfeld (DE); Joerg Bahr, Altenholz-Klausdorf (DE); Juergen Carstensen, Kiel (DE)

(73) Assignee: Christian-Albrechts-Universitaet zu Kiel, Kiel (DE)

( * ) Notice: Subject to any disclaimer, the term of this patent is extended or adjusted under 35 U.S.C. 154(b) by 0 days.

(21) Appl. No.: 15/510,061

(22) PCT Filed: Sep. 7, 2015

(86) PCT No.: PCT/DE2015/100383
§ 371 (c)(1),
(2) Date: Mar. 9, 2017

(87) PCT Pub. No.: WO2016/037610
PCT Pub. Date: Mar. 17, 2016

(65) Prior Publication Data
US 2017/0263916 A1      Sep. 14, 2017

(30) Foreign Application Priority Data
Sep. 9, 2014   (EP) ..................................... 14184103

(51) Int. Cl.
*C25D 3/38*    (2006.01)
*C25D 5/02*    (2006.01)
(Continued)

(52) U.S. Cl.
CPC ....... *H01M 4/0452* (2013.01); *C23C 18/1653* (2013.01); *C23C 18/40* (2013.01);
(Continued)

(58) Field of Classification Search
CPC ............ H01M 4/0452; H01M 10/0525; C23C 28/023; C23D 18/1653; C23D 18/40;
(Continued)

(56) References Cited

U.S. PATENT DOCUMENTS

| 5,283,138 A | 2/1994 | Ferrando |
| 6,132,587 A | 10/2000 | Jorne et al. |

(Continued)

FOREIGN PATENT DOCUMENTS

| DE | 102005043242 A1 | 3/2007 |
| JP | 2005126664 A * | 5/2005 |

(Continued)

OTHER PUBLICATIONS

European Search Report dated Mar. 16, 2015, in European Application No. EP14184103.
(Continued)

*Primary Examiner* — Louis J Rufo
(74) *Attorney, Agent, or Firm* — Patent Central LLC; Stephan A. Pendorf

(57) ABSTRACT

Method for producing metallic surface discharge electrodes on nonmetallic substrates comprising the following steps: a) producing a metallic seed layer on a substrate; b) electrically contacting the seed layer with a metal wire network and an electrolyte containing metal ions; c) electrodepositing a metal film from the electrolyte at least on the seed layer, with the metal wire network being embedded into the metal film, wherein d) metal wire filaments that are movable relative to one another are arranged to form an electrically percolating metal wire network, e) the arrangement of the metal wire filaments is cast into a gel and the gel is dried thereafter to the gel matrix, and f) the dried gel matrix with the metal wire network embedded therein is applied to the substrate and is wetted with a solvent of the gel matrix. Furthermore, the invention relates to a semifinished product for carrying out the method.

10 Claims, 2 Drawing Sheets

Figure 1:
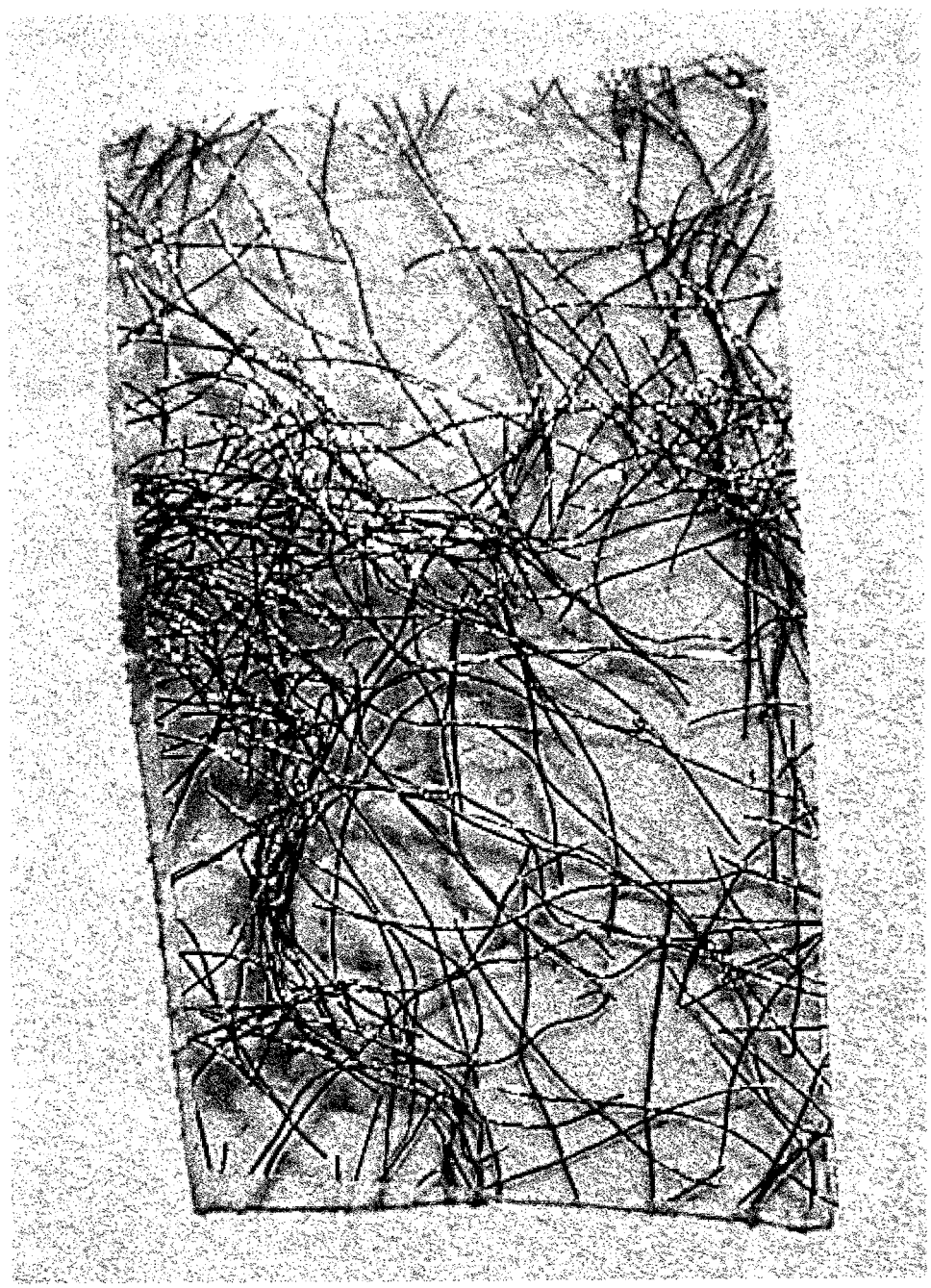

(51) Int. Cl.

| | | |
|---|---|---|
| *C25D 5/54* | (2006.01) | |
| *C25D 7/12* | (2006.01) | |
| *H01M 4/04* | (2006.01) | |
| *C23C 18/16* | (2006.01) | |
| *C23C 18/40* | (2006.01) | |
| *C23C 28/02* | (2006.01) | |
| *H01M 10/052* | (2010.01) | |
| *H01M 4/1395* | (2010.01) | |
| *H01M 10/0525* | (2010.01) | |
| *C25D 7/06* | (2006.01) | |

(52) U.S. Cl.
CPC .............. *C23C 28/023* (2013.01); *C25D 3/38* (2013.01); *C25D 5/02* (2013.01); *C25D 5/54* (2013.01); *C25D 7/06* (2013.01); *C25D 7/0607* (2013.01); *C25D 7/123* (2013.01); *H01M 4/1395* (2013.01); *H01M 10/052* (2013.01); *H01M 10/0525* (2013.01)

(58) Field of Classification Search
CPC ........ C25D 7/123; C25D 17/005; C25D 7/06; C25D 7/0607
See application file for complete search history.

(56) References Cited

U.S. PATENT DOCUMENTS

| | | |
|---|---|---|
| 6,194,032 B1 | 2/2001 | Svedberg et al. |
| 6,270,646 B1 | 8/2001 | Walton et al. |
| 2005/0052326 A1 | 3/2005 | Gundlach et al. |
| 2008/0206553 A1 | 8/2008 | Schneider et al. |
| 2009/0269511 A1* | 10/2009 | Zhamu .................. B82Y 30/00 427/558 |
| 2011/0174069 A1* | 7/2011 | Cornelius ............ B01J 19/0093 73/204.23 |
| 2012/0164529 A1 | 6/2012 | Bahr et al. |

FOREIGN PATENT DOCUMENTS

| | | |
|---|---|---|
| JP | 2005126664 A | 5/2005 |
| WO | 9913313 A1 | 3/1999 |
| WO | 03027353 A1 | 4/2003 |
| WO | 2011066818 A1 | 6/2011 |

OTHER PUBLICATIONS

International Search Report dated Nov. 20, 2015, in International Application No. PCT/DE2015/100383.

* cited by examiner ated surface areas of a substrate thin metal films—i.e.,
METHOD FOR PRODUCING SURFACE DISCHARGE ELECTRODES AND SEMIFINISHED PRODUCT FOR CARRYING OUT THE METHOD The invention relates to a method for producing surface discharge electrodes by means of electroplating, as well as a semi-finished product for carrying out the method.

Surface discharge electrodes devices for electrical—or even thermal—contacting of surface of a body and are made relatively flat, electrically conductive, and of metal, for example copper or a noble metal.

More specifically, surface discharge electrodes are particularly useful in the manufacturing of solar cells as a charge collector, or in battery manufacture as electrodes in contact with the electrochemically active medium.

Therein it is conventional to apply surface discharge electrodes directly onto the surface of the body, which will be referred to hereafter as the substrate, with methods of thin layer application, example, applying a thin metal film onto a silicon wafer with a sputtering process. For thicker layers and precise positioning of the electrodes an inkjet printing of metallic inks is known. For bulk products it is preferred for economical reasons of low cost and high processing speed to make use of electrochemical deposition from a metal-salt-containing bath.

Electrochemical deposition, including electroplating, is unproblematic with good electrically conducting substrates, but semiconductors such as silicon or ceramics require a pre-treatment to form a seed layer before they can be coated in the electrolyte. For forming the seed layer a wet chemical method is known, in which metal ions in the electrolyte are reduced by adding a reducing agent and deposited as metal element on the substrate surface.

For example, from document U.S. Pat. No. 6,194,032 B1 there is known a gel composition already containing the substances for the chemical deposition of a metal film, and by applying to predetermined and previously catalytically activated surface areas of a substrate thin metal films—i.e., 100 to 2000 nanometers thick—can be produced at these locations.

A surface discharge electrode should not have too-high an electrical resistance, and therefore must not be constituted from a too-thin metal film. Typically, one aims for a film thicknesses greater than 10 micrometers, preferably more than 20 micrometers. By electrically contacting the seed layer—usually selectively, usually on the edge of the seed layer—a voltage can now be applied and additional metal be deposited on the seed layer.

The electroplating is usually done at high current densities to achieve a high deposition rate. The seed layer thereby presents an a priori not precisely known ohmic resistance network, in which the current flows in at predetermined points. In all places of this network, the resistances change continuously during metal deposition, especially in the initial phase. Without accurate process control, it is often difficult to achieve a uniform deposition on the entire seed layer.

Particularly high demands on precision are made for example in the creation of metalized layers on integrated circuits, i.e., microchips. U.S. Pat. Nos. 6,132,587 and 6,270,646 B1 are both concerned with the task of creating devices for improved and more uniform electroplating of microchips. In U.S. Pat. No. 6,132,587 it is proposed to control a plurality of process parameters, including the flow of electrolyte to the substrate by the provision of a rotary distributor in front of the wafer. U.S. Pat. No. 6,270,646 B1 shows that a compressible, porous body electrically conductive on its surface is to be placed in contact with the wafer, that leads to the transmission of electroplating current to the substrate. The pore space of the body absorbs the electrolyte and provides access to the substrate.

It is also known to contact the seed layer in a manner in that a frame with parallel tensioned metal wires is placed on the seed layer, wherein starting from a terminal the current supplied is distributed through all wires. The electrolyte has free access to the seed layer through the space between the wires, and the deposition is carried out starting from wires in such a manner that the wires are embedded in the deposited metal. Generally, the entire surface discharge electrode thus produced, that is, the seed layer, the thereon electrodeposited layer and the wires embedded in this layer, of a single element metal, such as copper. The wires are considerably thicker than the deposited layer and protrude beyond this or project from this. The described electrode assembly is a standard design for many devices such as solar cells or microelectronic components, in order to minimize material, that is, depending on the application, to provide small footprint, light weight, little shading, and a highly conductive surface discharge electrode.

However, the aforementioned contacting of the seed layer with wires is problematic when larger surfaces with correspondingly longer wires are to be electroplated. Even slightest bending of wires, that is, mechanical stresses in the wires, make it virtually impossible to produce enough homogeneously distributed contact points for the seed layer. A press-on of the wires during the electrodeposition is not possible, since this at least locally reduces the wetting of the surface with fresh electrolyte.

The invention is concerned with the object of simplifying the production of large surface area surface discharge electrodes via electrodeposition.

The object is achieved by a method for production of metallic surface discharge electrodes on non-metallic substrates with the steps
a. producing a metallic seed layer on a substrate;
b. electrically contacting the seed layer with a metal wire network and an electrolyte containing metal ions;
c. electrodepositing a metal film from the electrolyte at least on the seed layer, with the metal wire network being embedded into the metal film,
wherein
d. metal wire filaments that are movable relative to one another are arranged to form an electrically percolating metal wire network;
e. the arrangement of the metal wire filaments is cast into a gel and the gel is dried thereafter to the gel matrix, and
f. the dried gel matrix with the metal wire network embedded therein is applied to the substrate and is wetted with a solvent of the gel matrix. Furthermore, the invention relates to a semi-finished product for carrying out the method.

The dependent claims disclose advantageous embodiments of the method. An independent claim is directed to a semi-finished product that is formed in the course of the procedure which in itself is storage stable and is marketable as an aid for carrying out the invention.

The starting point of the invention was investigations by the inventors into the efficient production of surface discharge on silicon by chemical deposition of a seed layer and electroplating with wire frame contacting as described above. Therein the following was realized:

The parallel wires interconnected at the edge of the workpiece allow a transport of electricity with low ohmic losses to the edge of the sample, but are not the ideal choice for this, since they have no cross-connections. Such cross-connections are however highly desirable as they lead to a high fault tolerance: A single broken wire does not lead to a complete isolation of regions of the seed layer, rather, those areas are then connected via cross-connections with the rest of the network. A network constructed of intersecting parallel wires satisfies this property, however, requires a lot of metal to efficiently connect all surface elements with the edge. If, in addition, the contact points of the intersecting wires are rigidly connected to each other, so that the network is significantly stiffer than merely parallel wires, then the problem described above of the problem of contact between the seed layer and the wires is significantly increased. Moreover, the overall surface area of the wire network must be as small as possible as compared to the seed layer, since galvanic deposition takes place at all surface points in contact with the electrolyte, but mainly is intended to lead to an increase in metal film thickness.

According to the invention, therefore, the wire network is formed of mutually moveable metal wire filaments—referred to for brevity in the following as filaments—wherein the filaments have lengths in the range of from 2 millimeters to 1 centimeter and diameters in the range of from 50 to 500 microns. Filaments used preferably have a length in the range of 5 to 9 millimeters, and a diameter in the range of 80 to 200 micrometers. It is expressly not necessary that all filaments of a network have the same lengths or diameters. The filaments are preferably made of copper or a noble metal. Preferably, the filaments consist of the same metal element with which the substrate is to be electroplated.

The wire network according to the invention could in principle be composed by the selective arrangement of the individual filaments, with care to ensure the existence of a sufficient number of contact points of the filaments with each other. This procedure is complicated and repetitive so might be entrusted to a robot. It is sufficient and much simpler to pour the filaments without orientation onto a planar support—but however not yet onto the substrate or as the case may be the seed layer. The filaments then lying criss-cross in random order usually form all by themselves a wire network with good contact with each other.

The wire network of the invention should be designed to be electrically percolating along the seed layer, that is, an electric current can flow from each peripheral contact point of the network to each other edge contact point of the network. The term "edge contact point" is to be understood as a point on a filament on the outer edge of the wire network, which is electrically in contacted with input leads, for example, by means of metal clamps.

The ohmic resistance network connected to the wire network should also have the property, that between two diametrically opposed peripheral contact points along all directions approximately the same ohmic total resistance exists. A wire network should preferably only be used for carrying out the invention, if the minimum and the maximum resistance values do not differ by more than a factor of two. It can easily be seen with a few test measurements, whether the wire network has the required properties.

The network formed of filaments has a higher number of contact points to the support than laid-on parallel wires or lattice, since the filaments are movable relative to each and every single filament "searches" for their own individual support points on the support. Although it can occur sporadically that some filaments do not touch the surface, but rather are borne solely by the other filaments, but even then they still cause the cross-contact arrangement of the filaments and at the same time press with their own weight the load-bearing filaments onto the support.

The filament network in this state is not readily transportable onto the substrate with the seed layer. Another inventive step is therefore the pouring of a gel onto the wire network previously provided on the support and drying the initially flowable gel to a gel matrix with the wire network embedded. In this way the filaments are temporarily fixed in their arrangement, as it were "frozen".

With this step, a semi-finished product is created, comprising the dried gel matrix and the embedded wire network. The dried gel forms a mechanically quite stable, plastic film-like film and can be lifted together with the wire network from the substrate—on which the filaments were previously poured. The semi-finished product is typically a flat disk a few millimeters thick, which can be stored as long as desired, and is also easy to transport. It can be cut or punched.

With regard to the method of the invention, the ability to manufacture a semi-finished product that can be stored and manipulated, means that the method can be interrupted by a storage step or transport step—for the semi-finished product—between the method steps e and f. The serial production of the semi-finished can be readily outsourced to other locations or manufacturers.

Advantageously, the wire filaments are easy to recognize with the naked eye in a largely transparent dried gel. For series production of the semi-finished product one could therefore easily sprinkle very large areas with filaments and pour gel and then after drying automatically cut out those areas where the visible network indicates a high probability of likelihood of electrical percolation and a largely non-directional total resistance. Any waste is completely reusable.

Typically, for electroplating, aqueous metal salt solutions are used. In this case, hydrogels are used to form the semi-finished product, including:
a. protein gels—e.g. gelatin
b. nucleic acid gels—e.g. agarose
c. polymers—polyacrylamide (PAA).

These types of gel have in common, that the basic components themselves have a low ionic conductivity and that they are relatively stable in the pH range necessary for electrodeposition and do not decompose upon applying the necessary voltages. Nucleic acids and polyacrylamides are polysaccharides, as used, for example, in microbiology for gel electrophoresis, for separation of ions (DNA) from the matrix surrounding them.

The hydrogels act like a sponge: Once the polymer chains come into contact with water, they swell to a gel on without exerting forces on the embedded wire network. The wire filaments are again movable relative to each other inside the swollen gel. The surface tension of the water results in a very intimate contact of the gel layer to the surface of a workpiece, which significantly increases the number of contact points of the wire network with the seed layer compared to the situation with air or even without gel embedding in the liquid.

Thus, the semi-finished product according to the invention not only fixes the formed network of filaments for transport to or for depositing onto the seed layer, but it also brings about a remarkably improved contacting of the network with the seed layer.

After application of the semi-finished product onto the seed layer and the wetting of the semi-finished product with water or aqueous electrolyte, the electroplating can be carried out in a manner known per se. Resupplied electrolyte is not significantly impeded by the swollen hydrogel. The hydrogel is either chemically decomposed during electroplating or washed off after the end of the metallization together with the electrolyte. The wire filaments in contrast are embedded in the produced metal film and remain there as structures projecting out of the film. The semi-finished product is to this extent consumed in electroplating.

Figure 2:
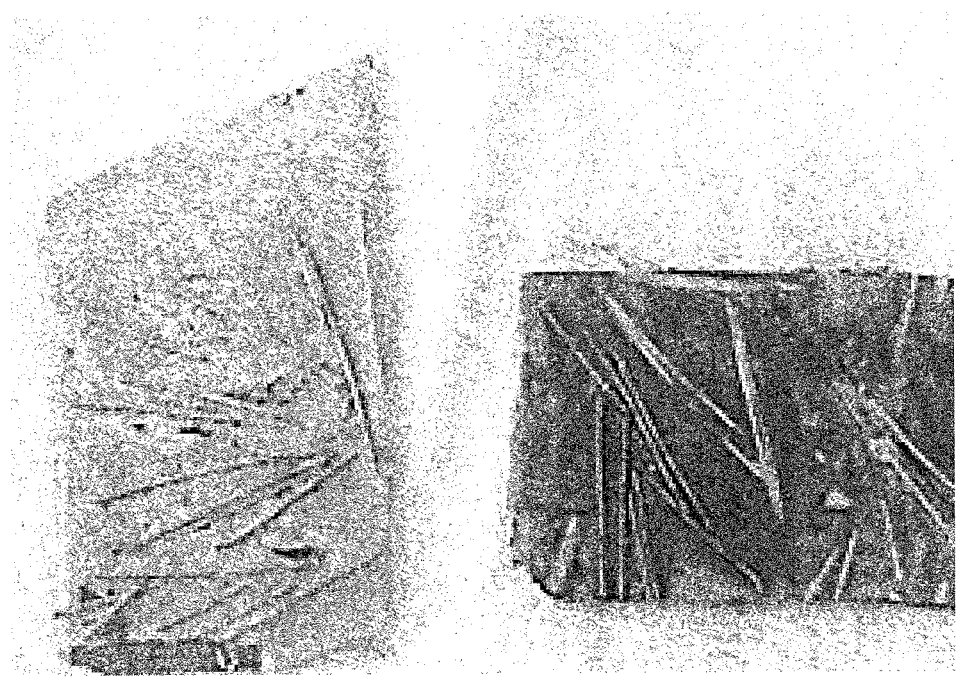

Below an embodiment of the invention and two very advantageous embodiments are presented. Therein, the figures show:

FIG. 1 photograph of a semi-finished product usable for the production of surface discharge electrodes;

FIG. 2 photograph of two surface discharge electrodes.

The semi-finished product shown in FIG. 1 is produced by sprinkling or pouring copper wire filaments with diameters between 100 and 200 microns and a length of 9 mm onto a dry substrate. The thus formed wire network is cast into a matrix of polyacrylamide (pure, powder, Roth), wherein an amount of 0.2 g PAA powder in 6 ml of deionized water is used. The PAA powder dissolves very well in water below 50° C. If a higher proportion by weight of PAA used a "food of the gods" (ambrosia)—like gel forms, which is useless for this purpose. Also, too high a proportion of water is not appropriate.

Subsequently, the gel is dried for 24 hours in room air, whereby it transitions into a film-like plastic state. The semi-finished product shown is then complete. It can be cut into pieces and distributed for example onto two substrates.

Surface discharge electrodes as shown in FIG. 2 can be produced from the semi-finished product shown in FIG. 1. Prior to electroplating, pieces of the semi-finished product are each arranged on substrates and placed together with the substrates for 2 minutes in 30° C. warm deionized water. It should be ensured that the gel matrix does not dissolve completely.

A particularly advantageous embodiment of the invention is the fact that in the hydrogel already during casting of wire network—i.e. the manufacture of semi-finished product—the electrolyte and other chemical substances for the wet-chemical deposition of a seed layer may be added. However, this deposition is to be initiated only upon contact of the semi-finished product with the substrate to be plated, that is, the semi-finished product is deprived of an activating component, which is introduced only upon contact with the substrate. This component will be referred to herein as reaction activator. The method follows the proposal of the aforementioned U.S. Pat. No. 6,194,032 B1, and further improves this in a manner which already leads directly to the embedding of the wire filaments in the then produced seed layer.

It should here be understood that in the context of the invention, the embedding of the filaments in the seed layer represents a construction according to the preamble of contacting of the seed layer, even if this is only formed in the presence of the filaments.

Specifically, for electroplating of silicon with copper, it has been found that the hydrogel is preferably mixed—gelled—with a solution of copper sulphate ($CuSO_4$) and hydrofluoric acid (HF). In particular, PAA appears resistant also to HF. For example, 0.2 g PAA powder is dissolved in 6 ml of hydrofluoric acid. The solution consists of 4 wt. % hydrofluoric acid and 1.9 g $CuSO_4$ dissolved in 98 ml of deionized water.

The gel dries as described above, and there results a semi-finished product with predominantly green color due to the copper salt. If the semi-finished then placed on silicon and wetted with water, so immediately a chemical reaction initiates, in which dissolution occurs at the surface of the silicon and a thin copper film is deposited between the filaments. In this particular case, the substrate itself is the reaction activator, wherein the hydrofluoric acid from the semi-finished product attacks the silicon.

The chemical attack on the silicon can also have undesirable effects on the substrate. In some applications, however small losses of silicon are completely unproblematic. This is especially true when making contact with free-standing silicon nanowire arrays as are known for example from published document US 2012/164529 A1 or from WO 2011/066818 A1. Published document WO 2011/066818 A1 teaches on page 3 that, in the production of battery electrodes, it is highly desirable to continue processing those arrays on the side of the freestanding nanowire ends, especially with a metal film, which partially envelopes the nanowire.

But the documents do not specify how this could be quickly and inexpensively accomplished, preferably by electrodeposition. The basic problem is the creation of a seed layer on the outside lying, free nanowire ends, which also have a lateral connectivity, with simple means.

With the help of the inventive method and the semi-finished product the production of a wire-enveloping metal film is now quite simple. The semi-finished product, preferably loaded as described above with $CuSO_4$ and HF, is placed on the freestanding silicon tips. It is advantageous to use nanowire arrays according to the description of WO 2011/066818 A1 as a substrate because the free ends then have largely symmetrical arrangement. When wetting the semi-finished product with water, there forms, beginning at the tips of the silicon tips, of which the upper tips are being dissolved, a laterally together-growing, thin copper film. Once the chemical reaction comes to a completion, the copper film lies on the remaining nanowire peaks, which at this time did not need to have been considerably shortened. In the course of the subsequently possible electrochemical deposition the copper film is then thickened, whereby partial sections of the silicon nanowires gradually continue to be enclosed, since the electrolyte can reach both sides of the copper film.

The invention claimed is:

1. A method for the production of metallic surface discharge electrodes on non-metallic substrates with the steps
    a. producing a metallic seed layer on a substrate;
    b. electrically contacting the seed layer with a metal wire network and an electrolyte containing metal ions; and
    c. electrodepositing a metal film from the electrolyte at least on the seed layer, with the metal wire network being embedded into the metal film,
wherein electrically contacting the seed layer with the metal wire network comprises:
    d. arranging metal wire filaments that are movable relative to one another are arranged to form an electrically percolating metal wire network;
    e. casting the metal wire into a gel; and
    f. drying the gel with the arrangement of metal wire filaments to form a gel matrix,
wherein the dried gel matrix with the metal wire network embedded therein is applied to the seed layer on the substrate and is wetted with a solvent of the gel matrix.

2. The method of claim 1, wherein the arrangement of metal wire filaments is randomized by pouring onto a flat surface.

3. The method according to claim 1, wherein the metal wire filaments have lengths in the range of from 2 mm to 1 cm.

4. The method according to claim 1, wherein the diameter of the metal wire filaments is in the range of from 50 to 500 microns.

5. The method according to claim 1, characterized by a storage or transport step between the steps e. and f.

6. The method according to claim 1, wherein chemical substances are mixed into the gel matrix/the gel, which upon contact with the substrate and in the presence of a reaction activator carry out a chemical deposition of the seed layer on the substrate.

7. The method according to claim 1, wherein the substrate is made of silicon exhibiting an array of parallel, upright nanowires, wherein the dried gel matrix with the metal wire filaments is applied on the free ends of the nanowires.

8. The method according to claim 7, wherein said method is used for producing electrodes for lithium-ion batteries.

9. The method according to claim 1, wherein the metal wire filaments have lengths in the range of from 5-9 mm.

10. The method according to claim 1, wherein the diameter of the metal wire filaments is in the range of from 100 to 200 micrometers.

\* \* \* \* \*